United States Patent [19]

Hochgesang

[11] Patent Number: 4,773,780

[45] Date of Patent: Sep. 27, 1988

[54] KEYBOARD WITH A METAL CARRIER PLATE

[75] Inventor: Gerhard Hochgesang, Bad Neustadt, Fed. Rep. of Germany

[73] Assignee: Preh, Elektrofeinmechanische Werke, Jakob Preh, Nachf. GmbH & Co., Bad Neustadt, Fed. Rep. of Germany

[21] Appl. No.: 922,856

[22] Filed: Oct. 24, 1986

[30] Foreign Application Priority Data

Oct. 26, 1985 [DE] Fed. Rep. of Germany ....... 3538146

[51] Int. Cl.⁴ .............................................. B41J 5/12
[52] U.S. Cl. ............................... 400/472; 340/365 R; 235/145 R; 400/495
[58] Field of Search ............... 400/472, 473, 486, 490, 400/495, 479, 479.1, 479.2, 477, 495.1; 235/145 R, 145 A, 146; 340/365 R, 365 S, 365 C, 365 P, 365 L; 200/5 E

[56] References Cited

U.S. PATENT DOCUMENTS 3,749,872  7/1973  Foster .......................... 200/166 PC
3,797,630  3/1974  Zilkha ............................. 400/479.1
3,900,712  8/1975  Fukao ............................. 400/479.1
4,202,640  5/1980  Schmidt et al. ..................... 400/472

OTHER PUBLICATIONS

IBM Technical Disclosure Bulletin, vol. 13, No. 7, Dec. 1970.
Journal Industrie Elektrik+Elektronik, Jan. 30, 1985, pp. 12-13.

Primary Examiner—Charles A. Pearson
Assistant Examiner—Huong Q. Phan
Attorney, Agent, or Firm—Woodcock Washburn Kurtz Mackiewicz & Norris

[57] ABSTRACT

A keyboard with a metal carrier plate and a guide frame for keys to be attached thereto. The guide frame has a base part which is provided with legs. The legs of the guide frame are inserted into openings in the carrier plate. To secure the guide frame to the carrier plate, each opening has a recess starting at the lower edge of the carrier plate and which terminates at a bracket which is formed as part of the carrier plate. The legs are provided with foot parts which slide into the recess located beneath the respective bracket, causing a peg to snap into another opening in the carrier plate. In such a manner, the guide frame is secured to the carrier plate.

4 Claims, 2 Drawing Sheets

KEYBOARD WITH A METAL CARRIER PLATE

BACKGROUND OF THE INVENTION

This invention relates to a keyboard having a number of keys attached thereto. More specifically, this invention relates to a keyboard with a metal carrier plate and a guide frame for keys attached thereto with the legs of each guide frame being retained in openings in the carrier plate.

A keyboard of this type is shown in the Jan. 30, 1985 edition of the journal *Industrie-Electrik+Electronik.* Here, a keyboard is disclosed in which the legs of the guide frames to be attached to the keyboard are fitted with snap-in lugs which grip the carrier plate from below, thus projecting beyond the carrier plate. Such a type of connection between the guide frame and the carrier plate is particularly undesirable when a switch foil is to be placed beneath the carrier plate. Another unfavorable feature is the fact that a guide frame snapped into the carrier plate cannot be removed from above the carrier plate, complicating the replacement of a defective guide frame by requiring the disassembly of a housing which typically surrounds the keyboard so that the lower edge of the carrier plate is accessible.

SUMMARY OF THE INVENTION

The purpose of the invention is to recommend a keyboard of the above-mentioned type in which the legs which secure the guide frame to the carrier plate accomplish such a task without projecting beyond the lower edge of the carrier plate. Such a keyboard would permit the removal of the guide frames without manipulation beneath the carrier plate being necessary.

According to the invention disclosed herein, the above purpose is fulfilled for a keyboard of the above-mentioned type, by the fact that each of the openings which receive a leg for securing of the guide frame to the carrier plate is provided with a recess in a corner area of the opening. The recess extends from the lower edge of the carrier plate and terminates at a bracket which is formed in the corner area of the recess. The legs of the guide frame are inserted in the corresponding opening in the carrier plate and a foot part of each leg is slid beneath the corresponding bracket into the recess to secure the guide frame to the carrier plate. Thus, the guide frame is held on the carrier plate by means of the foot part. The foot part lies in the recess and therefore does not project beyond the lower edge of the carrier plate.

One advantage to the above-described configuration is that each guide frame can be replaced separately if needed. For removal of a particular guide frame from the carrier plate, the specific guide frame need only be displaced so that its foot parts are slid out of the recess located beneath the brackets. The legs of the guide frame can then be lifted out of the corresponding opening and the guide frame removed from the carrier plate. Such a method of removal would not require the disassembly of the housing that typically would surround the keyboard.

Another favorable feature of the invention is that it is not necessary to affix the legs to the carrier plate by hot shaping. This facilitates not only the process of replacing guide frames but also installation of the guide frames on the carrier plate, since a carrier plate fitted with guide frames in a standard arrangement can easily be re-equipped with additional guide frames.

The measures described also make it possible for the guide frames to be mechanically inserted into the carrier plate.

In a preferred embodiment of the invention, a peg is formed onto the guide frame, said peg being associated with an additional opening in the carrier plate, the securing opening being sized such that the cross section of the peg and the securing opening are essentially the same size. Because of the fact that the peg engages in the opening, unwanted displacement of the guide frame cannot occur if the foot parts of the guide frame are slid beneath the brackets. Engagement of the peg in the securing opening ensures alignment of the guide frame on the carrier plate.

In one embodiment of the invention, the peg is formed onto a spring-elastic strap on the frame. To allow replacement of the guide frame, the strap can be lifted so that the peg comes out of the securing opening, after which the guide frame can be shifted and removed.

BRIEF DESCRIPTION OF THE DRAWINGS

The present invention may be better understood and its numerous objects and advantages will become apparent to those skilled in the art by reference to the accompanying drawings in which:

In FIG. 1, Zone 2 is a top view of the carrier plate without a key attached. Zone 3 is a top view of the carrier plate with a key attached thereto. Zone 4 is a sectional view of the top edge of the carrier plate with a key attached, said section being taken along the carrier plate such that the engagement of the guide frame and the carrier plate is shown. Zone 5 is a second sectional view of the carrier with a key attached, said section being taken above the carrier plate.

DESCRIPTION OF THE PREFERRED EMBODIMENT

Figure 1:
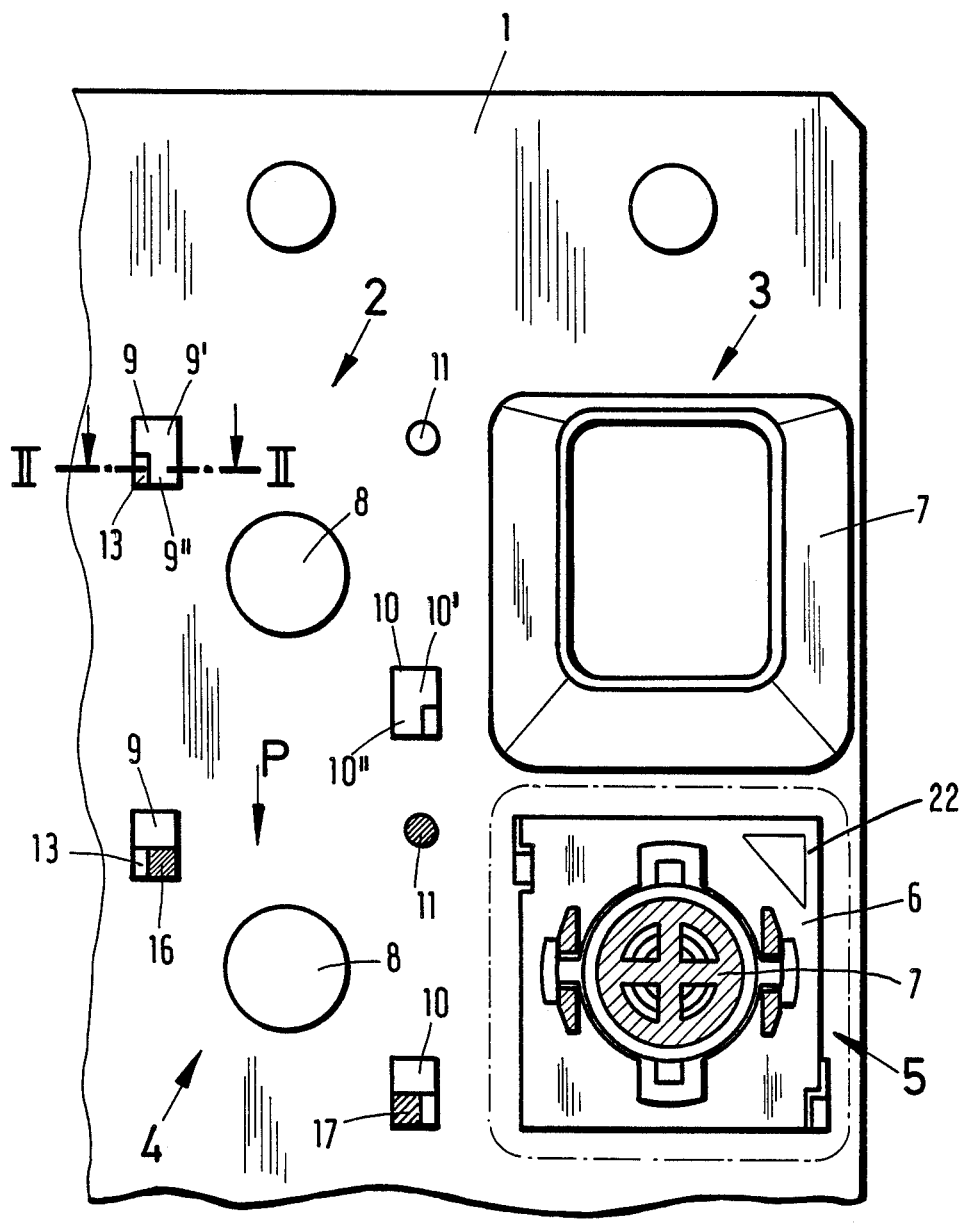
FIG. 1 is a top view of the carrier plate of a keyboard having a metal carrier plate with keys attached thereto which embodies the present invention.

Referring first to FIG. 1, a metal carrier plate 1, which is to have any number of keys 7 attached thereto, has an opening 8 for each key 7 to be attached to the carrier plate 1, each opening 8 preferably located centrally with respect to the corresponding key 7. Such central opening 8 permits a switch rod on the key 7 to act upon a foil switch placed beneath the carrier plate 1 such that depression of a respective key 7 may be communicated to a device which employs the described novel keyboard with a metal carrier plate. Carrier plate 1 is further provided with two additional openings 9 and 10 for each key 7 to be attached. Preferably, openings 9 and 10 would be of equal size and of similar rectangular shape, spaced an equal distance apart on a diagonal along carrier plate 1. Additionally, the carrier plate 1 is further provided with a securing opening 11, preferably circular in shape, for each key 7 to be attached. Securing opening 11 is provided to firmly secure guide frame 6 to carrier plate 1.

Figure 2:
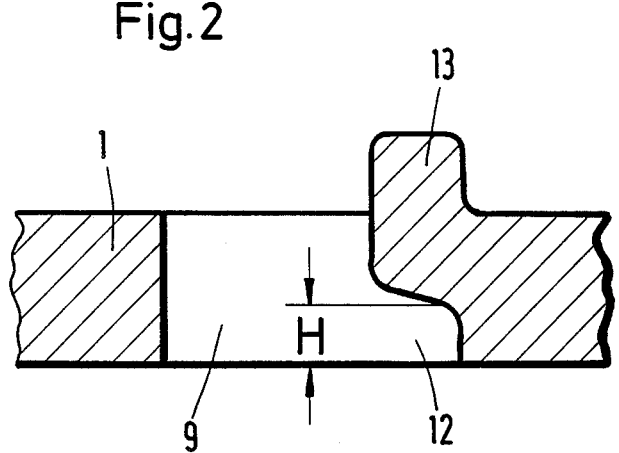
FIG. 2 is a cross-section view taken along line II—II of Zone 2 of FIG. 1.

Turning next to FIG. 2, the shape of first and second openings 9 and 10 may be better seen. First and second openings 9 and 10 are provided with a recess 12 which commences at the lower edge of carrier plate 1 in a corner area of openings 9 and 10 respectively, each recess 12 terminating at a respective bracket 13, the bracket 13 extending over the recess 12. The recess 12 and bracket 13 of first opening 9 and the recess 12 and bracket 13 of second opening 10 are formed along opposite outer edges of the respective first or second opening. The recess 12 and the bracket 13, which lie along a common axis, are produced by the fact that a pressure tool forming the openings 9 and 10 has a step corresponding to the recess 12. The height of the recess 12 is indicated as H. Thus, openings 9 and 10 may be more precisely described as including an insertion area 9' and 10' and a slide-in area 9" and 10", such slide-in area 9" and 10" being smaller than the respective insertion area 9' and 10' and continuous with insertion area 9' and 10'.

Figure 3:
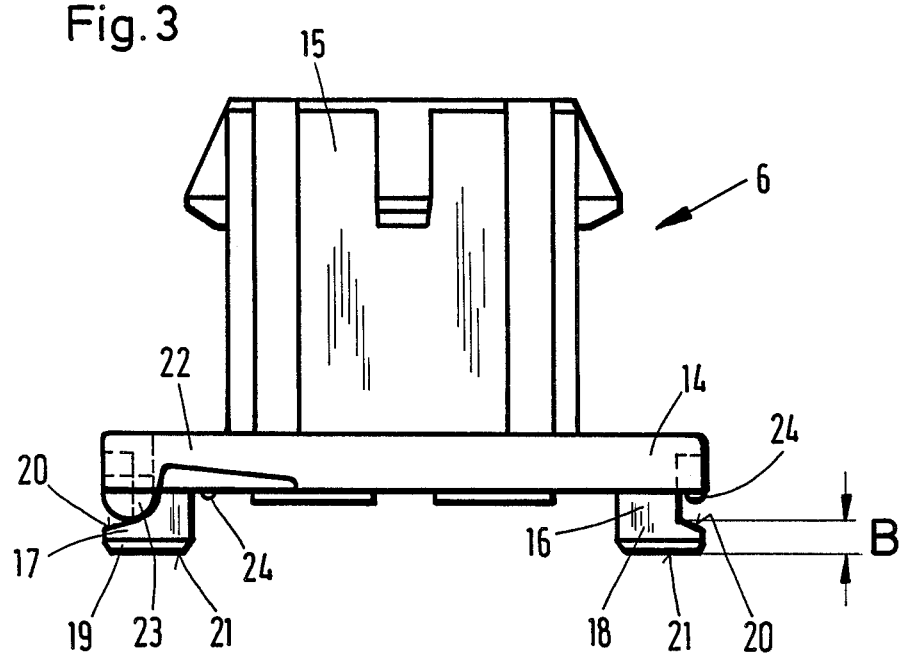
FIG. 3 is a side view of a guide frame for keys intended for attachment to the carrier plate of FIG. 1.

Turning next to FIG. 3, the configuration of the guide frame 6 for accommodating the key 7 is now described. The guide frame 6 has a sleeve 15 formed onto a base part 14 to accommodate the key 7. Formed onto the base at two diagonally opposite corner points are two legs 16 and 17. The legs 16 and 17 end in a respective foot part 18 and 19, each foot part having a bevel 20 which projects outward with respect to the respective legs 16 and 17. Each foot part 18 and 19 terminates at a respective sole 21. The foot parts 18 and 19 taper towards the respective sole 21 to facilitate insertion of the foot parts 18 and 19 into the openings 9 and 10. The height of the foot parts 18 and 19 is designated as B. This dimension is approximately equal to the height H of the recess 12. Projecting from a third corner point on the base part 14 of the guide frame 6 is a spring-elastic strap 22, on which a peg 23 is placed. Peg 23 has a diameter corresponding to the diameter of the securing opening 11 of carrier plate 1 which corresponds to each key 7 attached to carrier plate 1. Placed opposite the foot parts 18 and 19 on the base part 14 are support studs 24. Support studs 24 provide for the support of guide frame 6 on the carrier plate 1.

Returning to FIG. 1, the attachment of guide frame 6 to carrier body 1 is accomplished in the following manner:

Guide frame 6 is aligned with respect to a section of carrier plate 1 which is provided with a central opening 8, first opening 9, second opening 10 and securing opening 11. The guide frame 6 is pressed onto the carrier plate 1 so that the foot parts 18 and 19 penetrate insertion areas 9' and 10' of openings 9 and 10 respectively. The guide frame 6 is then displaced in the direction of the arrow P of FIG. 1 so that the foot parts 18 and 19 move into slide-in areas 9" and 10" and the bevels 20 on the foot parts 18 and 19 slide beneath the bracket 13 corresponding to the first and second openings 9 and 10. This causes the peg 23 which is attached spring-elastic strap 22 to snap into the securing opening 11. In such a manner, the peg 23 and spring-elastic strap 22 releasably position the guide frame 6 on carrier plate 1. Support studs 24 rest upon the carrier plate 1 to further support the guide frame 6 in maintaining the desired positioning on carrier plate 1, thus locking the guide frame 6 into the desired position on carrier plate 1. The soles 21 of the foot parts 18 and 19 are thus aligned with the lower edge of the carrier plate 1 which faces away from the guide frame. Furthermore, foot parts 18 and 19 do not project beyond the lower edge of carrier plate 1. In this manner, the guide frame 6 is secured to and aligned with carrier plate 1 as well as being nonrotatably and non-displaceably retained on the carrier plate 1. Once guide frame 6 is secured to carrier plate 1 in the proper alignment, a switch rod on the key 7 may pass through the central opening 8 to act upon a foil switch which is commonly placed beneath the carrier plate 1 in keyboards of the above-described type. Such a mechanism permits the communication of the actuation of key 7 to a device which employs the described novel keyboard with a metal carrier plate.

When removal of guide frame 6 from carrier plate 1 is desired, the strap 22 of the guide frame 6 is pivoted upward until the peg 23 comes out of the securing opening 11. The guide frame 6 is then slid opposite to the direction of the arrow P of FIG. 1, causing the foot parts 18 and 19 to move out of the slide-in areas 9" and 10" and into insertion areas 9' and 10', thus causing the bevel 20 of foot parts 18 and 19 located beneath a respective bracket 13 to simultaneously slide out from beneath the respective bracket 13 and into the insertion areas 9' and 10' of the first and second openings 9 and 10. At this point, legs 16 and 17 can be removed from the first and second openings 9 and 10 by lifting guide frame 6 off the carrier plate 1 from above, thus detaching guide frame 6 from carrier plate 1.

Thus, there has been described and illustrated herein apparatus for a keyboard with a metal carrier plate having a number of keys attached thereto. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed:

1. A keyboard for attaching any number of keys thereto comprising a metal carrier plate having at least one opening for each key to be attached and a guide frame for each key to be attached, each said guide frame having a leg, wherein said leg is retained in said opening and said carrier plate corresponding to said leg, characterized in that each said leg further comprises a foot part and each said openings provided with a recess and a bracket, said recess and said bracket formed along the same vertical axis, said recess extending from the lower edge of said carrier plate and terminating in said bracket, such that said leg engages said opening and said foot part of said leg slides beneath said bracket to attach said guide frame to said carrier plate, each said guide frame further comprising a peg and a spring elastic strap, said peg formed onto said spring elastic strap, and said carrier plate is further provided with a corresponding securing opening for each said guide frame, wherein said peg engages said corresponding securing opening to secure said guide frame to said carrier plate.

2. A keyboard according to claim 1 characterized in that said peg and said spring elastic strap releasably position said guide frame for securing said guide frame to said carrier plate.

3. A guide frame for a key to be removably attached to a carrier plate to form a keyboard comprising:
    a sleeve;
    a base part having a first and a second corner oppositely orientated, said base part attached to said sleeve;
    a first leg attached to said first corner of said base part;

a second leg attached to said second corner of said base part such that said first and second legs are oppositely orientated on said base part;

a first foot attached to said first leg;

a second foot attached to said second leg, said first foot and said second foot oppositely orientated;

a peg attached to a third corner of said base; and a spring elastic strap, said peg being formed on said spring elastic strap.

4. The guide frame of claim 3 wherein said peg and said spring elastic strap releasably position said guide frame for securing said guide frame to said carrier plate.

* * * * *